US009288972B1

(12) United States Patent
Link et al.

(10) Patent No.: US 9,288,972 B1
(45) Date of Patent: Mar. 22, 2016

(54) TOOL AND COLLAR DEVICE FOR USE WITH ATTACHING SKIRTS OF A FISHING LURE

(75) Inventors: Donald J. Link, Shakopee, MN (US); Timothy J. Link, Shakopee, MN (US); Eric W. Schwartz, Bloomington, MN (US)

(73) Assignee: Skirts Plus Corporation, Shakopee, MN (US)

( * ) Notice: Subject to any disclaimer, the term of this patent is extended or adjusted under 35 U.S.C. 154(b) by 501 days.

(21) Appl. No.: 13/271,184

(22) Filed: Oct. 11, 2011

Related U.S. Application Data

(60) Provisional application No. 61/391,614, filed on Oct. 9, 2010.

(51) Int. Cl.
*A01K 85/18* (2006.01)
*A01K 85/00* (2006.01)

(52) U.S. Cl.
CPC ............... *A01K 85/18* (2013.01); *A01K 85/00* (2013.01)

(58) Field of Classification Search
CPC ....... A01K 85/00; A01K 91/00; A01K 85/18; A01K 85/02; A01K 85/16
USPC ............ 43/42.28, 42.24, 42.11, 42.13, 42.39, 43/42.37, 42.36, 42.32, 44.2, 44.8; 16/2.1
See application file for complete search history.

(56) References Cited

U.S. PATENT DOCUMENTS

| | | | |
|---|---|---|---|
| 3,078,611 A * | 2/1963 | Nishioka | A01K 85/00 43/42.05 |
| 3,867,781 A * | 2/1975 | Wolfe | A01K 85/00 43/42.05 |
| 4,616,440 A * | 10/1986 | Millroy | A01K 85/12 43/42.06 |
| 4,777,757 A * | 10/1988 | de Marees van Swinderen | A01K 85/01 43/41 |
| 4,942,689 A | 7/1990 | Link et al. | |
| 5,113,607 A * | 5/1992 | Pate | 43/42.28 |
| 5,517,782 A | 5/1996 | Link et al. | |
| 5,709,047 A | 1/1998 | Link | |
| 5,899,015 A | 5/1999 | Link | |
| 5,960,580 A | 10/1999 | Link | |
| 6,082,038 A | 7/2000 | Link | |
| 6,125,569 A | 10/2000 | Link | |
| 6,199,312 B1 | 3/2001 | Link | |
| 6,272,787 B1 | 8/2001 | Link | |
| 6,357,167 B1 * | 3/2002 | Bradford | 43/42.09 |
| 6,598,336 B2 * | 7/2003 | Link | A01K 85/00 43/42.24 |
| 6,601,336 B1 | 8/2003 | Link | |
| 6,651,376 B1 | 11/2003 | Link | |
| 2001/0035263 A1 | 11/2001 | Link | |
| 2002/0038492 A1 * | 4/2002 | Hashimoto | 16/2.1 |

(Continued)

*Primary Examiner* — Darren W Ark
*Assistant Examiner* — Thien Thanh Pham
(74) *Attorney, Agent, or Firm* — Dustin R. DuFault; DuFault Law Firm, P.C.

(57) ABSTRACT

A tool and collar for affixing a multi-banded skirt to a fishing lure is disclosed. The collar includes a base member containing a central bore having a first portion with a first diameter and a second portion having a greater diameter. An outer annulus is contained on the collar for receiving a binder. The tool includes first and second mateable rods which receive the collar therebetween. Banded strands dispose on each rod in relation to the collar. The binder is positioned over each strand and disposed into the annulus to tie the strands to the collar. Opposing ends of each banded strand are cut to form the skirt. The collar and skirt are removed from the rods and positioned onto a lure with the first portion of the bore seating onto a retaining portion of the lure, and the second portion of the bore disposed about a flange thereof.

6 Claims, 8 Drawing Sheets

(56) References Cited

U.S. PATENT DOCUMENTS

| | | |
|---|---|---|
| 2002/0178644 A1 | 12/2002 | Link |
| 2005/0017043 A1 | 1/2005 | Link et al. |
| 2006/0185220 A1* | 8/2006 | Greene et al. ................ 43/42.28 |
| 2007/0094913 A1 | 5/2007 | Link |
| 2008/0022581 A1 | 1/2008 | Link |
| 2013/0065505 A1* | 3/2013 | Yoskowitz .................... 454/317 |

* cited by examiner

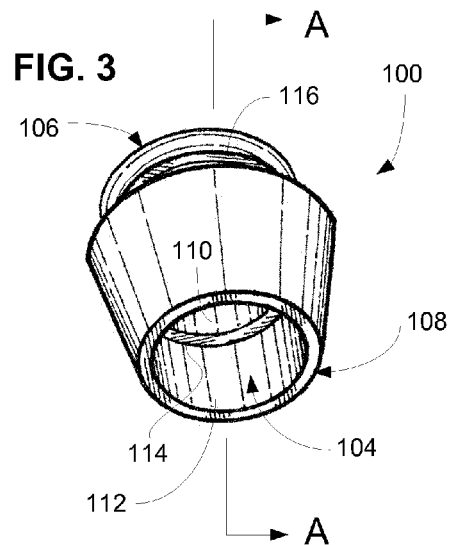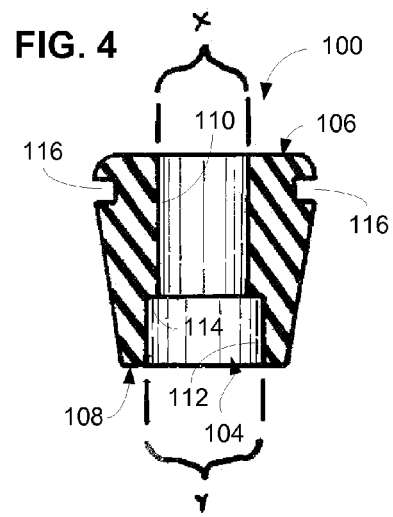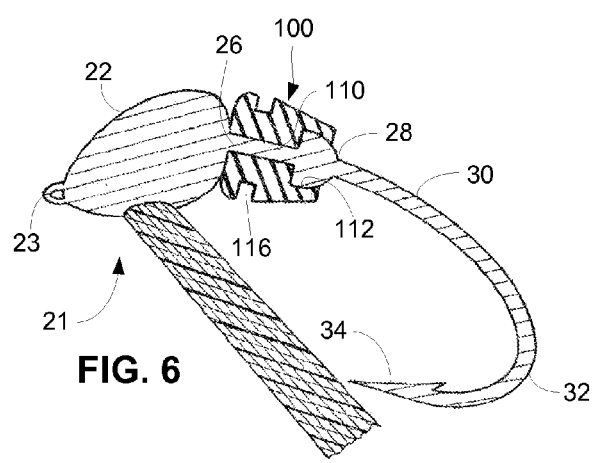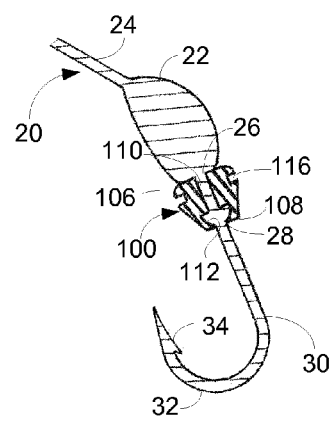

TOOL AND COLLAR DEVICE FOR USE WITH ATTACHING SKIRTS OF A FISHING LURE

CROSS-REFERENCE TO RELATED APPLICATION(S)

This application claims the benefit of similarly titled U.S. Provisional Patent Application No. 61/391,614 filed on 9 Oct. 2010, which is hereby incorporated herein by reference.

BACKGROUND OF INVENTION

The present invention is generally directed at skirted fishing lures. More particularly, the present invention is directed collars which are formed in various constructions to affix a multi-filament skirt to a lure, as well as a tool in which to affix the multi-filament skirt to said collar.

With the expanded popularity of sport fishing, and in particular bass and walleye fishing, a myriad of different lures have arrived on the market. Generally, these lures are designed from varieties of materials and in varying shapes and colors to enable fishermen to present a variety of basic offerings or presentations for top water, mid-water and bottom fishing. Each presentation is tailored to a particular application, for example, the structure being fished, zone of fish suspension, the mood of the fish, or the weather. Colors and attractors are attached to accentuate the offerings. The different lures enhance the fisherman's ability to match conditions and entice a strike.

Two common lures include spinner baits, as illustrated in FIG. 1, and a jig head, as illustrated in FIG. 2. Common characteristics shared by both lures include a ¼ to 1 ounce lead head which is molded to an appropriate up-turned eye hook or shaft for connection to a fishing line. Large numbers of such lures exist and which exhibit differing head designs, dressing attachment flanges and hook shapes, not to mention the attached dressings. The lures are formed to accept, or are fitted with, various dressings, for example, wire forms and spinner blades, plastisol bodies and multi-filament skirts, to enhance movement or attractant qualities.

Multi-filament skirts fitted to the lures are also normally fitted to flanges that project from the aft end of the head. Barbs or an annular ridge may be provided at the flange. The skirts typically are threaded over the flange and positioned in abutment to the head. The skirts typically include a collar from which a number of filaments trail. Examples of such skirts and lures are generally disclosed within the following commonly owned patents, each of which is incorporated herein by reference:

U.S. Pat. No. 5,709,047
U.S. Pat. No. 5,899,015
U.S. Pat. No. 6,199,312
U.S. Pat. No. 6,272,787
U.S. Pat. No. 6,544,372
U.S. Pat. No. 6,598,336

However, due to the varying manufacturers and the different sized overall heads on both spinner baits and jig heads, there is no universally accepted diameter size or length of the retainer or flange. As such, specific collars corresponding to the size of the respective flange must be produced in order to adequately attach a skirt to the lure. This requires a variety of different collars needing to be manufactured and distributed for each specific lure manufacturer, or to accommodate a specific sized retainer or flange. There therefore exists a need in the art to provide a universal collar capable of affixing multi-banded skirts to a multitude of lure retainer and flange sizes.

Moreover, in configuring the collar of the present invention, prior-art tools which were used to form and attach the multi-banded skirts are no longer effective in performing the same function. Such an exemplary tool of the prior-art is fully disclosed in commonly owned U.S. Pat. No. 6,125,569, which is hereby fully incorporated herein by reference. There therefore exists a further need to provide a tool to effectively and efficiently attach the multi-banded skirt to the collar of the present invention.

BRIEF SUMMARY OF INVENTION

The present invention includes a flexible collar for affixing a multi-banded skirt to a lure. The collar contains a channel or bore therethrough having two portions of differing diameters. The first portion of the channel having the lesser diameter seats upon a retainer of the lure, while the second portion of the channel seats over a flange of the lure. Optionally, a decorative tail can be adhered to the second portion of the collar. The collar contains an outer annulus for receiving a binder to secure the multi-banded skirt to the collar.

The present invention further includes a tying tool for affixing the multi-banded skirt to the collar. The tying tool includes a base member for supporting a vertical post, which in turn supports a first rotatable rod. The first rod includes a female portion for receiving a male portion a second rod. The male portion of the second rod is configured to receive the collar. Upon fitting the collar onto the second rod, the male portion is inserted into the female portion to secure the second rod to the first rod. Upon affixing the second rod to the first rod, rotational or pivotal movement of the second rod relative to the first rod is not permitted. However, both the first rod and the second rod are rotatable as a unit relative to the post. The tool further includes a mechanism to rotate the position of the secured rods.

To form a new skirt, the following steps are followed. A new collar is positioned onto the male end of the tying tool which is locked in place. A selected amount of adhesive may be applied to the annulus to assist in securing the banded strands therein. The male end of the tying tool is inserted into the corresponding female end of the tying tool. In so doing, colored pins on opposing ends of each rod are aligned with one another. A banded strand is stretched and hooked over the corresponding colored coded pins. The fixture is unlocked to enable the rods to be rotated, preferably 90 degrees, wherein the tool is again locked into place. Additional banded strands are added to the tool. Once all the banded strands are in place, a length of rubber thread is disposed between the fins and into the annulus. The thread is wound around the annulus such that the strands fan out and are evenly distributed about the fixture. Three knots are then tied with the thread. Excess thread is then snipped away. The strands are then cut at each end to form the skirt. The male rod is removed from the female rod, and the collar is removed from the male rod. The skirt is then ready to be applied to a fishing lure.

BRIEF DESCRIPTION OF THE DRAWINGS

FIG. 3 is a perspective view of a collar in accordance with a first embodiment of the present invention.

FIG. 4 is a cross-section view of the collar in accordance with the first embodiment of the present invention taken along lines A-A in FIG. 3.

FIG. 5 is a cross-sectional view of a collar in accordance with the first embodiment of the present invention positioned on the jig head of the prior art.

FIG. 6 is a cross-sectional view of a collar in accordance with the first embodiment of the present invention positioned on the spinner bait of the prior art.

DETAILED DESCRIPTION

Figure 1:
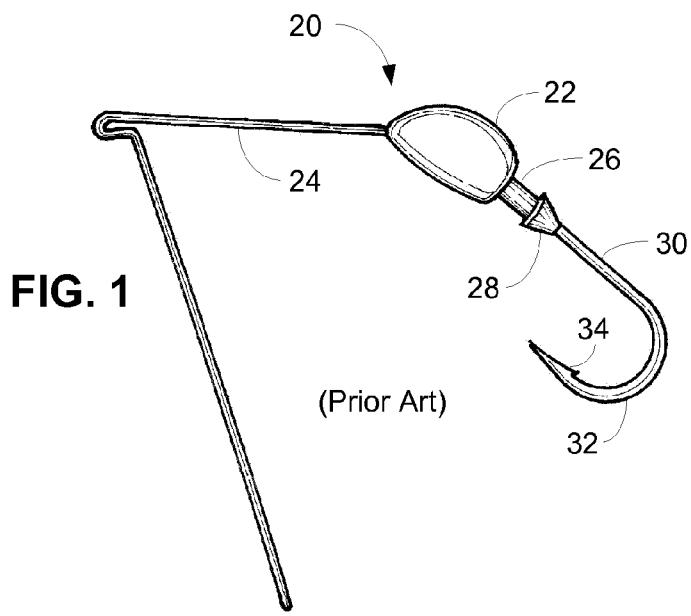
FIG. 1 is a perspective view of a prior-art spinner bait.
Figure 2:
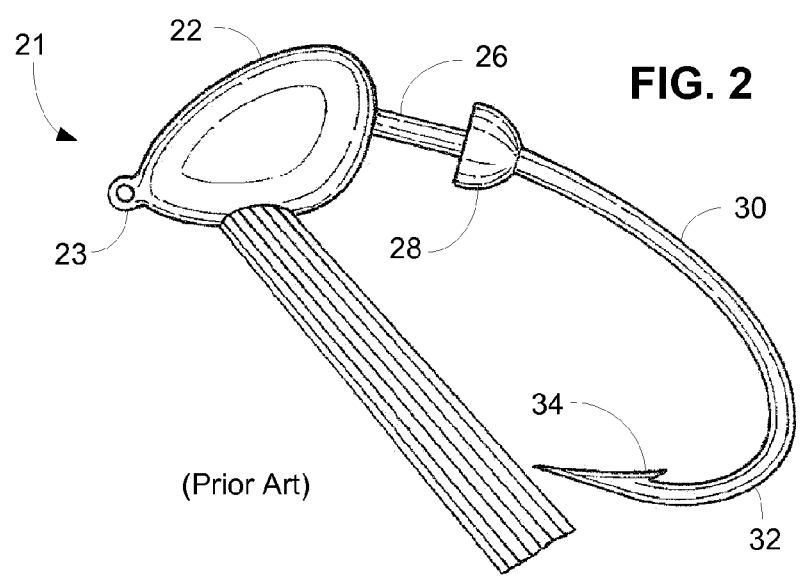
FIG. 2 is a perspective view of a prior-art jig head.

A spinner bait of the prior art is indicated at 20 in FIG. 1, while a jig head is indicated at 21 in FIG. 2. Both the spinner bait 20 and the jig head 21 generally include a ¼ to 1 ounce lead head 22 which is molded to an appropriate up-turned eye hook 23 or shaft 24 for connection to a fishing line (not shown). The head 22 exhibits an ellipsoid shape and is typically molded from lead, but can be molded from any of a variety of other materials which provide suitable weight and durability. An appendage or dressing retainer 26 extends aft of the head 22 and supports a flange 28. The appendage 26 projects along a shank 30 of the hook 32, forward of the barb 34.

A first embodiment collar of the present invention for affixing a multi-banded skirt to a spinner bait 20 or jig head 21 is generally indicated at 100 in FIGS. 3 and 4. The design of the collar 100 not only assists in forming the shape of the multi-banded skirt 102 (hereinafter generally referred to as a "skirt"), but to affix the skirt 102 to a variety of different sized spinner baits 20 or jigs 21, as illustrated in FIGS. 1 and 2, as distributed by various manufacturers. For purposes of this description, spinner baits 20 and jig heads 21 of the prior art will be used interchangeably. As best illustrated in FIG. 3, the collar 100 includes a channel or 104 beginning at a top end 106 and extending through to a bottom end 108. It should be noted that for purposes of this description, relative terms such as "top" and "bottom" are used in the context of the figures, and are by no means meant to be limiting. The channel 104 includes a first portion or bore 110 with a first diameter x and a second portion or bore 112 with a second diameter y. Diameter y is slightly larger than diameter x, thus forming a ledge 114 where the first bore 110 and the second bore 112 of the channel 104 meet. With the collar 100 being manufactured from an elastic and pliant material, for example rubber or silicone, when positioning the collar 100 onto the lure the first portion 110 can be positioned over the flange 28, being slightly stretched in the process, and retract back onto the retainer 26 of the lure 20 or 21, resulting in a snug fit as the wall of the first bore 110 of the channel 104 engages with the retainer 26 and the collar 100 is set in place. As is illustrated in FIGS. 5 and 6, upon positioning the collar 100 onto the spinner bait 20 (FIG. 5) or the jig head 21 (FIG. 6), the second bore 112 of the channel 104 having diameter y is positioned to fit over or about the flange 28. In so doing, and with the first portion 110 snugly fit against the retainer 26, the ledge 114 abuts against and engages the flange 28, preventing the collar 100 from unexpectedly sliding off during use.

Referring back to FIG. 4, the collar 100 further includes an outer annulus 116 positioned towards the top end 106 for receiving a string 118, or other suitable binder such as for example, a wire, for tying a plurality sets of banded strands 120 which eventually form the skirt 102. Immediately below the annulus 116, the lower portion 18 is downward tapered or frusto-conically formed to assist in directing individual strands to drape over the collar 100 to provide an overall natural and aesthetically pleasing look to the skirt 102.

Figure 7:
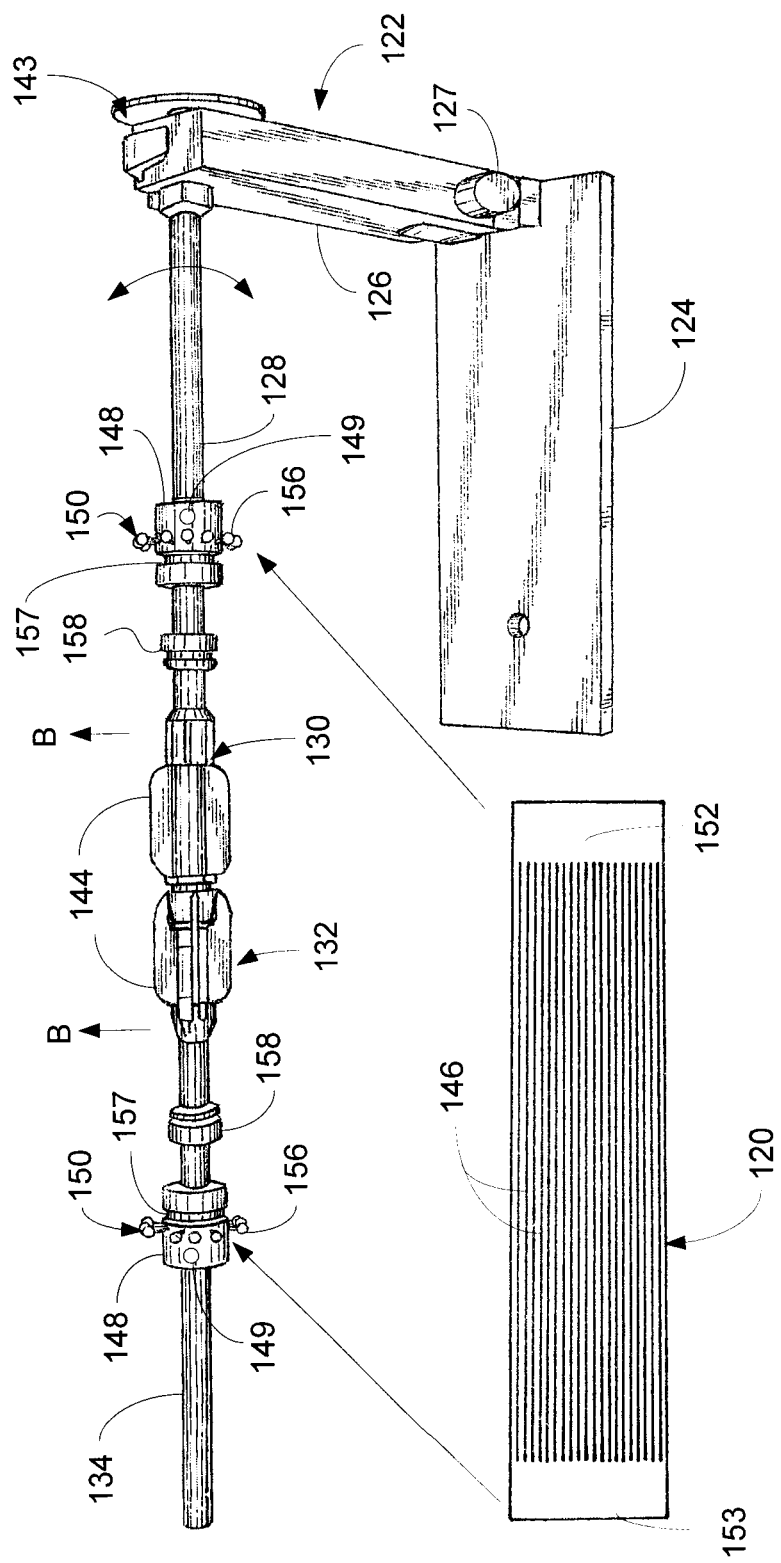
FIG. 7 is a perspective view of a fixture tool in accordance with the present invention.
Figure 8:
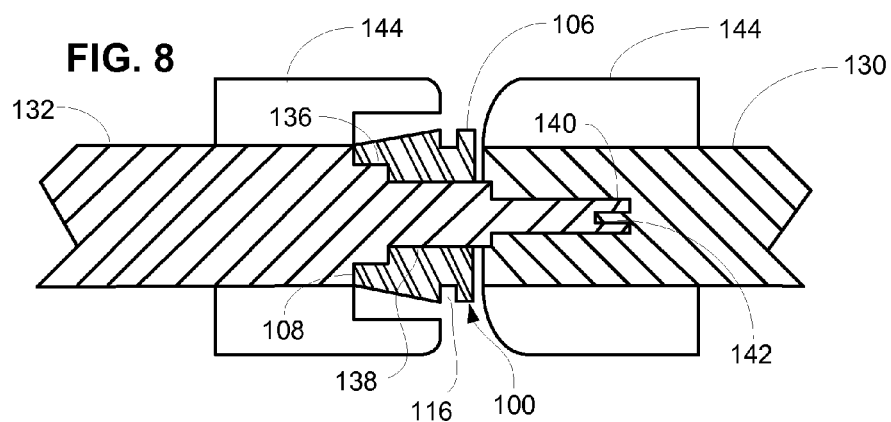
FIG. 8 is a cross-sectional view of the fixture tool taken along lines B-B in FIG. 7.
Figure 9:
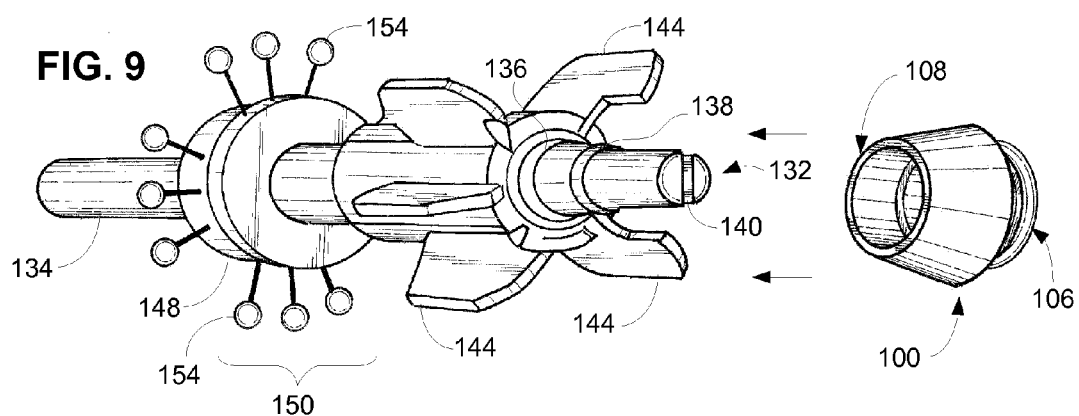
FIG. 9 is a perspective view of a male portion of a second rod of the fixture tool before the collar of the first embodiment of the present invention is positioned thereon.
Figure 10:
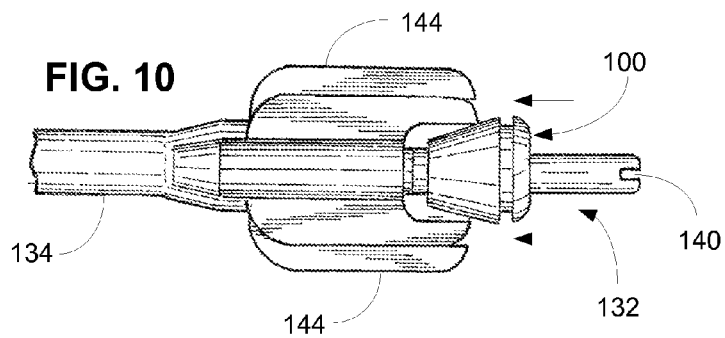
FIG. 10 is a side view of the male portion of the second rod with the collar of the first embodiment of the present invention positioned thereon.

To attach the plurality of banded strands 120 to the collar 100 to form the skirt 102, a fixture device or tool 122 is used. As illustrated in FIG. 7, the fixture device 122 includes a base member 124 attachable to a work bench or table (not shown) for supporting a stanchion or vertical post 126. The stanchion 126 may be pivotally attached to the base 124 by bolt 127. The stanchion 126 in turn supports a first rotatable rod 128 extending from a distal portion thereof. As illustrated in FIG. 8, an opposing end of the first rod 128 includes a female portion 130 for receiving a male portion 132 of a corresponding second rod 134. As illustrated in FIGS. 9 and 10, the male portion 132 is also configured to receive the collar 100, bottom end 108 first, including a portion 136 having an approximate diameter of y for receiving the second end 108 of the collar 100, and another portion 138 having an approximate diameter of x for receiving the first portion 106 of the collar 100. Upon fitting the collar 100 over the male portion 132 of the second rod 134, a selected amount of adhesive may be applied to the annulus 116 to assist in securing the banded strands 120 therein. The male portion 132 is then inserted into the female portion 130 to secure the second rod 134 to the first rod 128. Preferably, such securement prevents rotation or pivotal movement of the second rod 134 relative to the first rod 128. This is accomplished by providing the male portion 132 with a slot 140 and the female portion 130 with a corresponding tab 142 disposable within the slot 140, as is illustrated in FIG. 8. Upon positioning the tab 142 within the slot 140, rotational or pivotal movement of the second rod 134 relative to the first rod 128 is not permitted. However, as the first rod 128 rotationally attaches to the stanchion 126, both the first rod 128 and the second rod 134 are rotatable together relative to the stanchion 126. Further, it is well within the scope of the present invention to modify the configuration of the first and second rods such that the male end includes the tab and the female end includes a slot to receive the tab. The tool 122 further includes a mechanism 143 to rotate the position of the secured rods 128, 134, and lock the rods in a selected orientation which is helpful when hooking the banded strands to each rod.

The male portion 132 and the female portion 130 of the respective rods further include a plurality of fins 144 extending outward therefrom. The fins 144 assist in aligning individual filaments 146 of each banded strands 120 which form the skirt 102. Further, the fins 144 of the male portion 132 extend forward of the male portion and are designed to receive the lower half 108 of the collar 100 unhindered with the fins 144 terminating proximate to the annulus 116 when the collar 100 is fully positioned on the second rod 134. The first and second rods, 128 and 134 respectively, also include respective carriages 148 which contain a plurality of prong sets 150 for securing the banded strands 120 to the tool 122 when developing the skirt 102. Each carriage 148 is selectively positionable along its respective rod, 128 or 134, to accommodate banded strands 120 of differing sizes which may be used on a wide variety of lures, including jig heads or spinner baits. Upon positing each carriage 148 to its desired position along its respective rod 128 or 134, set screws 149 contained with each carriage 148 are set to lock the carriage in place. The banded strands 120 are preferably manufactured from an elastic material, for example silicone or rubber. As illustrated in FIG. 7, individual filaments 146 of each banded strand 120 are held together at opposing terminal ends by solid portions 152, 153 of the elastic material. To place each banded strand 120 onto the tool 122, the opposing terminal ends 152 and 153 are pulled apart and positioned about a corresponding prong set 150 positioned on the first rod 128 and the second rod 134. Each set of prongs 150, preferably containing three prongs 154 per set, may include a colored bulb 156 positioned on a terminal end thereof for aligning the male end 132 and female end 130 of the respective rods. As mentioned, corresponding fins 144 of both the first rod 128 and the second rod 134 assist in aligning individual strands 146. Prior to positioning the banded strands 120 onto each set of prongs 150, an adhesive (not shown) may be applied to the annulus 116 to further secure the strands 146 thereto.

Upon affixing a banded strand 120 to a set of corresponding prongs 150, the rods 128, 134 are pivoted between approximately a third to a quarter turn so that another banded strand 120 can be positioned onto the tool 122 in the same manner. This process is repeated until an adequate number of banded strands 120, preferably enough banded strands to cover the perimeter of the collar 100, are applied to the tool 122 to form the skirt 102. Typically between three and four banded strands 120 are used, but this number of banded strands 120 can be increased or decreased, depending on the size and type of skirt 102 desired.

Figure 11:
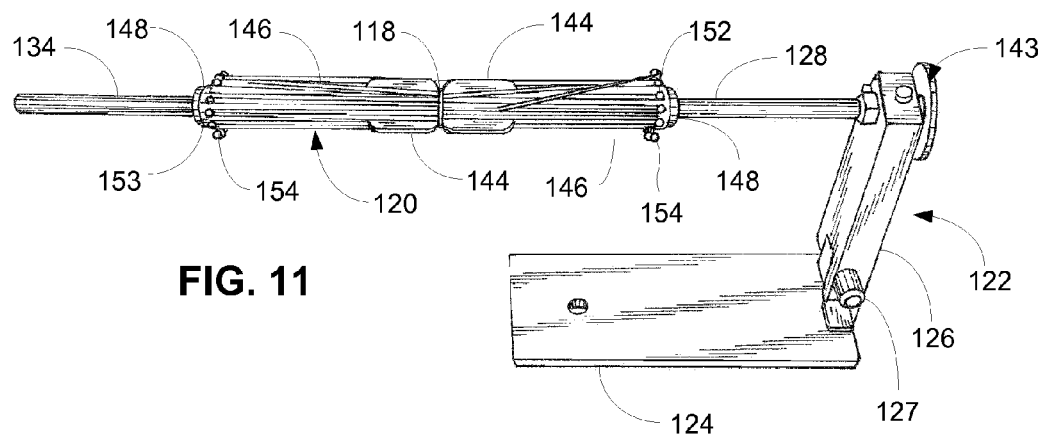
FIG. 11 is a perspective view of the fixture tool of the present invention with a plurality of banded strands positioned thereon.

Upon applying the banded strands 120 to the tool 122, the string 118 is used to tie the bands 120 to the collar 100, as illustrated in FIG. 11. As the fins 144 of the second rod 134 terminate proximate to the annulus 116 of the collar 100, these fins can be used as guides for positioning the string 118 to dispose within the annulus 116. Preferably, the string 118 is manufactured from an elastic material, which permits the collar 100 to expand when being positioned over the flange 28 of the jig 20 and retract back onto the retainer 26. Optionally, adhesive may be applied to the annulus 116 and the string 118 after the string 118 has bound the bands 120 to provide greater durability. It should be noted, though, that use of only an adhesive, without the string 118, to adhere to the strands 120 to the collar 100 is well within the scope of the present invention.

Figure 12:
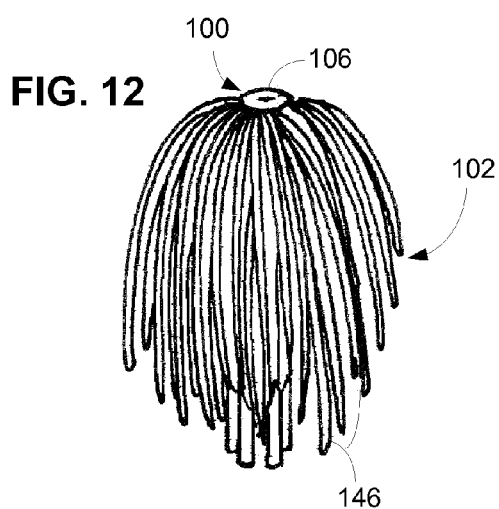
FIG. 12 is an upright perspective view of the first embodiment collar of the present invention containing a skirt.
Figure 13:
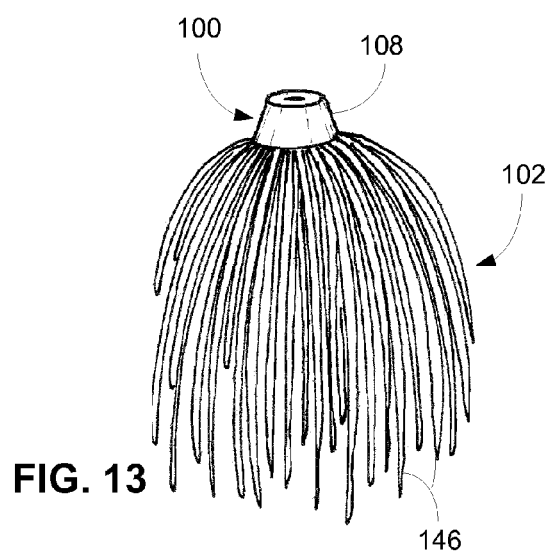
FIG. 13 is an upside down perspective view of the first embodiment collar of the present invention containing a skirt.
Figure 14:
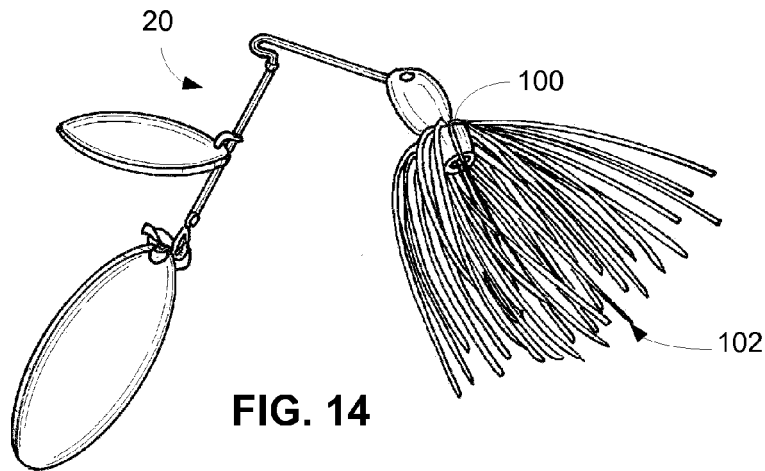
FIG. 14 is a perspective view of the skirt and first embodiment collar affixed to the head of the spinner bait of the prior art.

Upon securing the banded strands 120 to the collar 100, the opposing terminal ends 152 and 153 are cut with a scissors at a desired length. To ensure uniformity in length from one skirt to another, carriages 148 include a groove 157 for use as a cutting guide. Alternatively, if shorter skirts are desired, plastic or rubber grommet guides 158 slidably dispose on both the first rod 128 and the second rod 134 to assist the user in cutting the strands. The grommets 158 maintain a frictional engagement with each rod, and can be moved by the user to any desired position. Upon cutting each banded strand 120 on both ends 152 and 153, the second rod 134 is removed from the first rod 128, and the collar 100 removed from the second rod 134. The skirt 102 is thereby formed, as is illustrated in FIGS. 12 and 13. The skirt 102 is then positionable onto the jig head 20 to form the lure. To do so, the top portion 106 of the collar 100 is positioned first onto and past the barb 34, past the flange 28 and onto the retainer 26, for example, as is illustrated in FIG. 14. Due to the plasticity and elasticity of the collar 100, the skirt 102 can be mounted to a variety of different sized lures.

Figure 15:
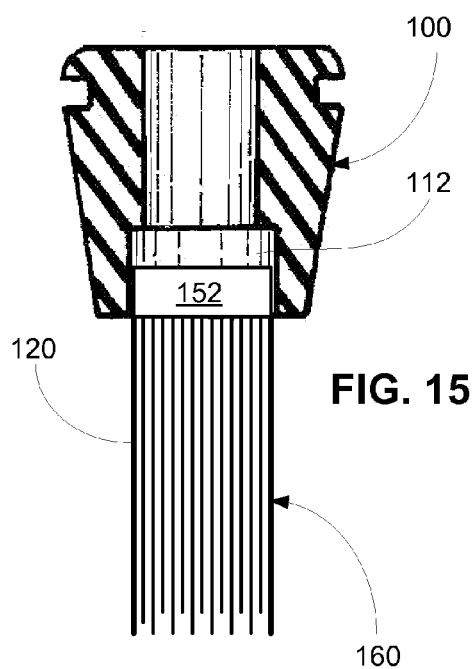
FIG. 15 is a cross sectional view of the first embodiment collar having a decorative tail adhered to a lower portion thereof.
Figure 16:
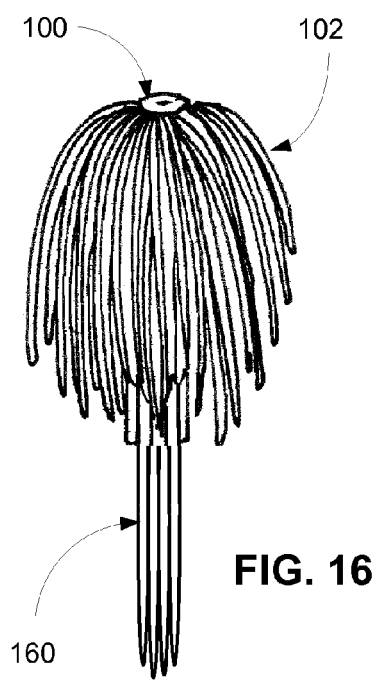
FIG. 16 is a perspective view of a skirt in accordance with the present invention having an optional decorative tail.

Optionally, a decorative tail 160 can be added to collar 100, as is illustrated in FIGS. 15 and 16. The tail 160 is formed by applying with adhesive portion 152 of banded strand 120 to an inner surface of the second lower portion 112 of the collar 100. Lower portion 153 of the banded strand 120 is then cut away, thus forming the decorative tail 160 which can extend past the skirt 102.

Figure 17:
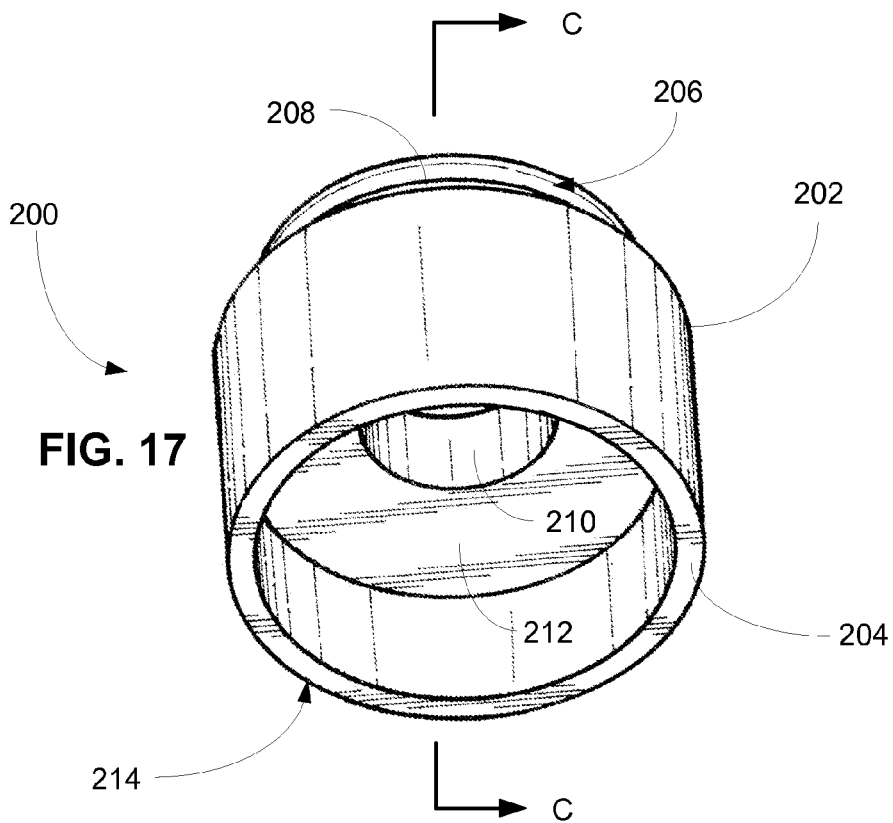
FIG. 17 is a perspective view of a collar in accordance with a second embodiment of the present invention.
Figure 18:
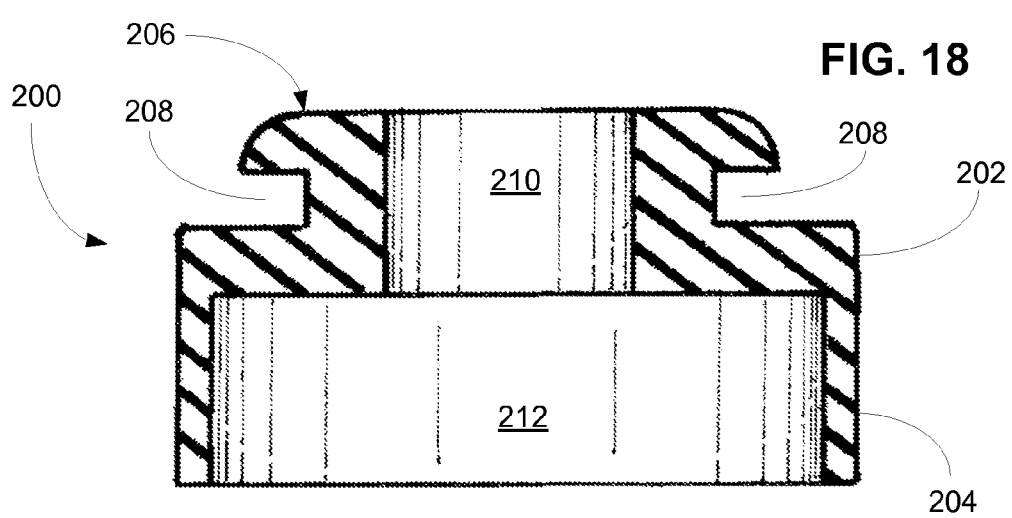
FIG. 18 is a cross-sectional view of the collar in accordance with the second embodiment of the present invention taken along lines C-C in FIG. 17.

Referring now to FIGS. 17 and 18, a second embodiment of the collar is illustrated at 200. The collar of the second embodiment is designed to be used with relatively larger spinner baits 20 and jig heads 21. The second embodiment collar 200 includes a base portion 202 having a circumferential wall 204 extending downward therefrom. Extending upward from an opposing side is a collared portion 206 having an outer annulus 208 for receiving a string, or other suitable binder, for tying banded strands 120 to the collar 200 which form the skirt 102, as similarly described with respect to collar 100 using tool 122. A channel 210 extends through the base portion 202 to a bottom end 214. Similar to the first embodiment 100, the collar 200 of the second embodiment is manufactured from an elastic or pliant material. The top portion 206 can therefore be positioned over the retainer 26 of the spinner bait 20 or jig 21, being slightly stretched in the process, resulting in a snug fit as the wall of the channel 210 engages with the retainer 26 and the collar 200 is set in place. An interior wall 212 of base 202 is abutable with the flange 28 of the spinner bait 20 or jig 21, preventing the collar 200 from unexpectedly sliding off during use of the lure.

Figure 19:
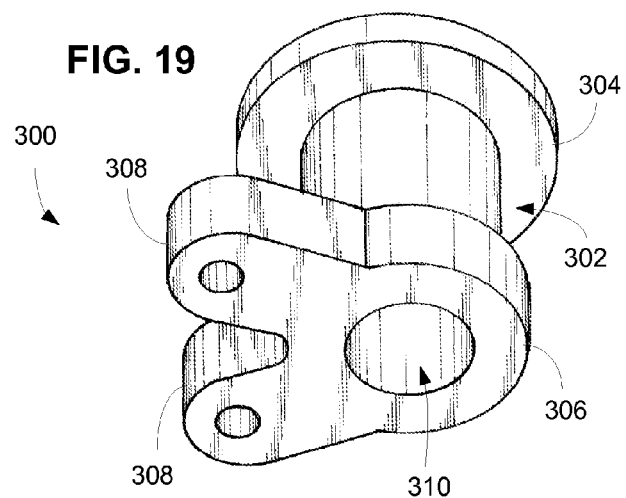
FIG. 19 is a perspective view of a collar in accordance with a third embodiment of the present invention.
Figure 20:
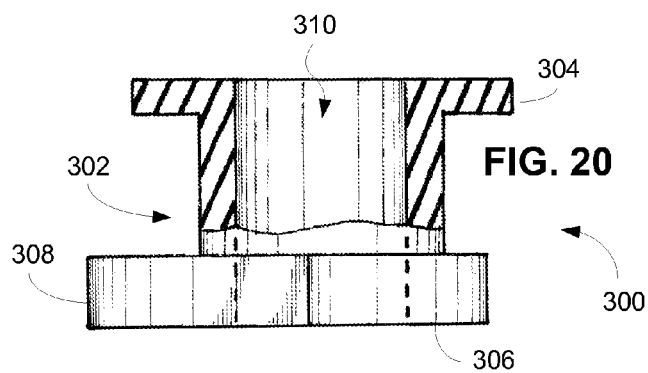
FIG. 20 is a partial cross-sectional side view of the collar in accordance with the third embodiment of the present invention.
Figure 21:
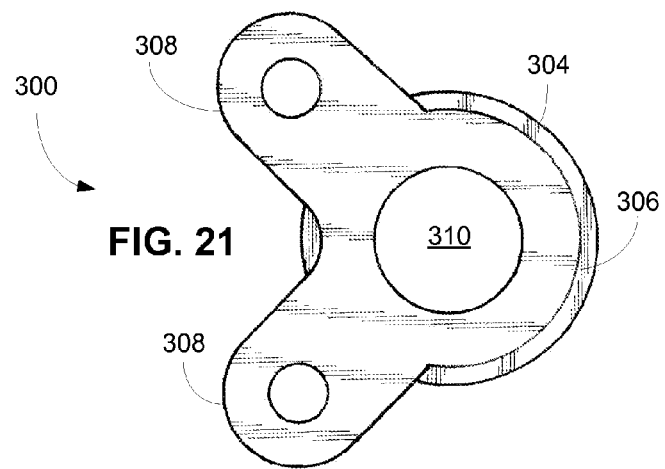
FIG. 21 is bottom view of the collar in accordance with the third embodiment of the present invention.

Referring now to FIGS. 19, 20 and 21, a collar in accordance with a third embodiment of the present invention is shown at 300. The collar 300 contains an elongated annulus 302 having opposing top flange 304 and bottom flange 306 positioned at terminal ends thereof. Flange 306 contains ears 308 with apertures for holding other forms of bait. A central channel is 310 is positionable to receive the retainer 26 of either the spinner bait 20 or jig 21 in the same fashion as previously described with regard to collar 100 or collar 200. A skirt can be affixed to the annulus 302 with the fixture device 122 as previously described herein. By employing an elongated annulus 302, the individual bands of the skirt are allowed to collapse more freely, resulting in less of a "hoop" look for the final skirt. In affixing the collar 300 to either the spinner bait 20 or jig 21, the collar 300 is positioned past the barb 34, hook 32 and flange 28 such that the top flange 304 seat next to the head 22, and bottom flange 306 abuts against flange 28.

Those skilled in the art should understand how to make and use the present invention based upon the description and attached drawings. Although the present invention has been described with reference to preferred embodiments, workers skilled in the art will recognize that changes may be made in form and detail without departing from the spirit and scope of the invention.

The invention claimed is:

1. In combination with a fishing lure, A collar for affixing a multi-banded skirt to the fishing lure comprising:
   the fishing lure having a retaining portion and a flange positioned between a head and a hook thereof;
   a frusto-conical unitary base member having a first end and an opposing second end, a diameter of the first end being greater than a diameter of the second end;
   a first cylindrical bore extending into the base member from the first end, the first cylindrical bore disposed onto the retaining portion of the lure;
   a second cylindrical bore extending into the base member from the opposing second end, the first bore and the second bore in communication with one another, the second bore having a greater diameter than the first bore, the second bore disposed onto the flange of the lure; and
   an annulus integrally disposed on an outer wall of the base member circumferentially around the first cylindrical bore, the annulus for retaining the multi-banded skirt.

2. The device of claim 1 and further comprising a ledge extending between the first bore and the second bore, the ledge abuttable against the flange of the lure to prevent removal of the collar from the lure.

3. The device of claim 1 wherein the base is constructed of an elastomeric material, wherein positioning the collar onto the fishing lure, the first bore is permitted to stretch to accommodate being positioned past and over the flange.

4. The collar of claim 1 wherein the multi-banded skirt disposes within the annulus, the multi-banded skirt being retained therein by use of a binder.

5. The collar of claim 1 wherein the annulus disposes on the outer surface of the base member about the first cylindrical bore.

6. In combination with a fishing lure, A collar for affixing a multi-banded skirt to the fishing lure comprising:
   the fishing lure including a retaining portion and a flange positioned between a head and a hook thereof;
   a frusto-conical unitary base member having a first end and an opposing second end, a diameter of the first end being greater than a diameter of the second end;
   a first cylindrical bore centrally extending into the base member from the first end, the first cylindrical bore disposed onto the retaining portion of the lure;
   a second cylindrical bore centrally extending into the base member from the opposing second end, the first bore and the second bore in communication with one another, the second bore having a greater diameter than the first bore, the second bore disposed onto the flange of the lure;
   an annulus contained on an outer surface of the base member proximate the first end thereof, the annulus positioned around the first cylindrical bore, the annulus for receiving a portion of the multi-banded skirt; and
   a binder disposable about the annulus to retain the multi-banded skirt.

* * * * *